(12) United States Patent
Livanec et al.

(10) Patent No.: US 8,765,645 B2
(45) Date of Patent: Jul. 1, 2014

(54) LOST CIRCULATION MATERIALS AND METHODS OF USING THE SAME

(75) Inventors: Philip Wayne Livanec, Deer Park, TX (US); Matthew Lynn Miller, Spring, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 113 days.

(21) Appl. No.: 13/423,769

(22) Filed: Mar. 19, 2012

(65) Prior Publication Data

US 2013/0244910 A1  Sep. 19, 2013

(51) Int. Cl.
*C09K 8/32* (2006.01)
*C09K 8/04* (2006.01)

(52) U.S. Cl.
USPC .......................................... 507/135; 507/119

(58) Field of Classification Search
None
See application file for complete search history.

(56) References Cited

U.S. PATENT DOCUMENTS

| | | | |
|---|---|---|---|
| 8,043,997 B2 | 10/2011 | Whitfill et al. | |
| 8,183,184 B2 | 5/2012 | Berkland et al. | |
| 2008/0058229 A1 | 3/2008 | Berkland et al. | |
| 2009/0221452 A1 | 9/2009 | Whitfill et al. | |
| 2011/0118152 A1 | 5/2011 | Braun et al. | |
| 2013/0105154 A1* | 5/2013 | Vorderbruggen et al. | 166/271 |
| 2013/0126190 A1* | 5/2013 | Mazyar et al. | 166/387 |

FOREIGN PATENT DOCUMENTS

WO  2008112009 A1  9/2008

OTHER PUBLICATIONS

Xin B., Hao J. Reversibly switchable wettability, Chem. Soc. Rev., 2010, 39, 769-782.*
B. Kakade, R. Mehta, A. Durge, S. Kulkarni, V. Pillai, Electric field induced, superhydrophobic to superhydrophilic switching in multiwalled carbon nanotube papers, Nano Letters, 2008, 8, 2693-2696.*
Lim H.S., Lee S.G., Lee D.H., Lee D.Y., Lee S., Cho K. Superhydrophobic to superhydrophilic wetting transition with programmable ion-pairing interaction, Adv. Mater., 2008, 20, 4438-4441.*
Wang L., Peng B., Zhaohui, S. Tunable wettability and rewritable wettability gradient from superhydrophilicity to superhydrophobicity, Langmuir, 2010, 26, 12203-12208.*
Foreign communication from a related counterpart application—International Search Report and Written Opinion, PCT/US2013/023238, Apr. 16, 2013, 14 pages.
Wang, Liming, et al., "Tunable Wettability and Rewritable Wettability Gradient from Superhydrophilicity to Superhydrophobicity," Langmuir Article, Apr. 2010, pp. 12203-12208, vol. 26, No. 14, American Chemical Society.
Xiu, Yonghao, et al., "Mechanically Robust Superhydrophobicity on Hierarchically Structured Si Surfaces," Nanotechnology, Mar. 2010, vol. 21, pp. 1-5, IOP Publishing Ltd.
Yang, Jin, et al., "Counterion Exchange to Achieve Reversibly Switchable Hydrophobicity and Oleophobicity on Fabrics," Langmuir Letter, May 2011, pp. 7357-7360, vol. 27, American Chemical Society.

* cited by examiner

*Primary Examiner* — Susannah Chung
*Assistant Examiner* — Kumar R Bhushan
(74) *Attorney, Agent, or Firm* — Craig Roddy Conley Rose, P.C.

(57) ABSTRACT

A method of servicing a wellbore in contact with a subterranean formation, comprising placing a wellbore servicing fluid comprising a drilling fluid and lost circulation material into a lost circulation zone within the wellbore, wherein the lost circulation material comprises a polyelectrolyte multilayer material and a first counterion. A wellbore servicing fluid comprising a drilling fluid and a lost circulation material comprising a polyelectrolyte multilayer material and a counterion comprising a halide, wherein the LCM has a first state that is hydrophilic. A tunable lost circulation material comprising a base material, a polyelectrolyte multilayer on said base material, wherein the polyelectrolyte multilayer comprises a first electrolyte layer, a second electrolyte layer, and a charged surface, and a counterion, wherein wettability of the lost circulation material is a function of the counterion.

24 Claims, 1 Drawing Sheet

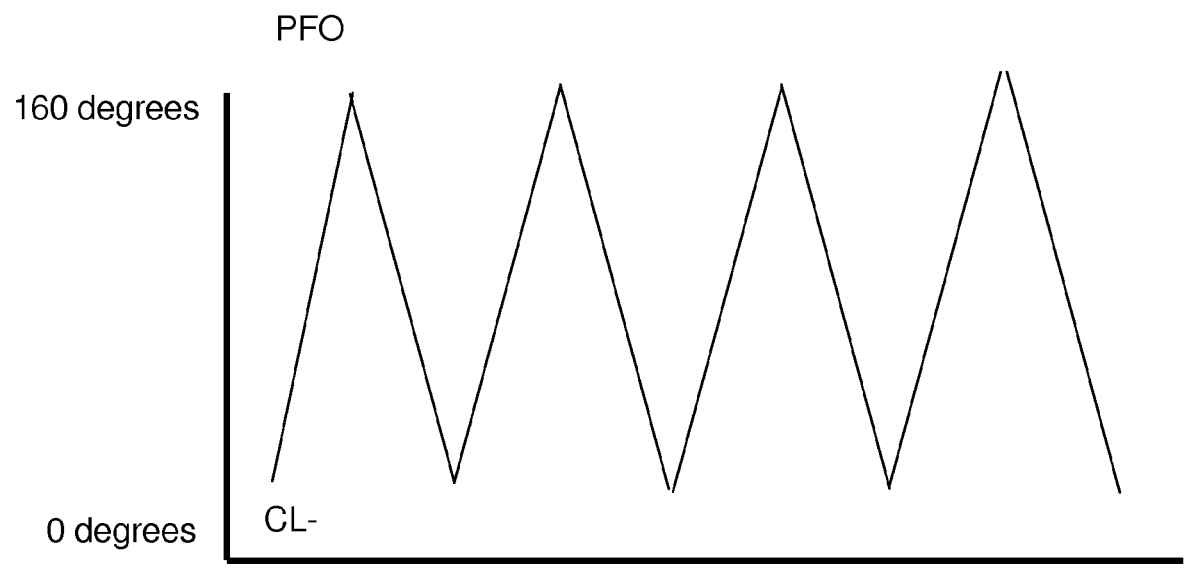

LOST CIRCULATION MATERIALS AND METHODS OF USING THE SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

This disclosure relates to materials and compositions for servicing a wellbore. More specifically, this disclosure relates to introducing materials and compositions into a wellbore penetrating a subterranean formation to reduce the loss of fluid to the formation.

2. Background

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well.

Fluids used in servicing a wellbore may be lost to the subterranean formation while circulating the fluids in the wellbore or otherwise placing the fluids in the wellbore. In particular, the fluids may enter and be "lost" to the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluids is more difficult to achieve. For example, a drilling fluid may be lost to the formation, resulting in the circulation of the fluid in the wellbore being terminated and/or being too low to allow for further drilling of the wellbore.

When considering remedies for lost circulation, a factor is the relative polarity of the subterranean formation which may be hydrophobic or hydrophilic depending on exposure of the surfaces of the subterranean formation to one or more oil-based or aqueous-based substances. As such, there is a need to consider the compatibility between the materials used to combat lost circulation and the surface of the subterranean formations with which they will interact (e.g., a surface associated with a lost circulation zone).

Accordingly, an ongoing need exists for compositions and methods of blocking the flow of fluid through lost circulation zones in subterranean formations.

BRIEF SUMMARY

Disclosed herein is a method of servicing a wellbore in contact with a subterranean formation, comprising placing a wellbore servicing fluid comprising a drilling fluid and lost circulation material into a lost circulation zone within the wellbore, wherein the lost circulation material comprises a polyelectrolyte multilayer material and a first counterion.

Also disclosed herein is a wellbore servicing fluid comprising a drilling fluid and a lost circulation material comprising a polyelectrolyte multilayer material and a counterion comprising a halide, wherein the lost circulation material has a first state that is hydrophilic.

Also disclosed herein is a tunable lost circulation material comprising a base material, a polyelectrolyte multilayer on said base material wherein the polyelectrolyte multilayer comprises a first electrolyte layer, a second electrolyte layer, and a charged surface, and a counterion, wherein wettability of the lost circulation material is a function of the counterion.

Also disclosed herein is a method of switching the wettability of a lost circulation material downhole comprising adding to a lost circulation zone within a wellbore, the lost circulation material, wherein the lost circulation material comprises a polyelectrolyte multilayered substrate and a first counterion; and adding a second counterion to the wellbore, the second counterion triggering a counterion exchange, thereby tuning the wettability of the lost circulation material downhole.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the invention, reference will now be made to the accompanying drawings in which:

FIG. 1 depicts a switch in the wettability on counterion cycling.

DETAILED DESCRIPTION

Disclosed herein are methods of servicing a wellbore in contact with a subterranean formation comprising placing wellbore servicing fluids comprising a lost circulation material (LCMs) into a lost circulation zone within the wellbore. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids, all of which are known in the art. The servicing fluid is for use in a wellbore that penetrates a subterranean formation. It is to be understood that "subterranean formation" encompasses both areas below exposed earth and areas below earth covered by water such as ocean or fresh water.

In some embodiments, the wellbore servicing fluid comprises a drilling fluid and a LCM. The LCM may be characterized by a tunable wettability. Wetting refers to the ability of a liquid to maintain contact with a solid surface, resulting from intermolecular interactions when the two are brought together. The degree of wetting (wettability) is determined by a force balance between adhesive and cohesive forces.

In an embodiment, the drilling fluid comprises a water-based mud (WBM), an oil-based mud (OBM), a synthetic-based mud (SBM), or combinations thereof. Herein, a WBM refers to a drilling fluid in which water or saltwater is the predominant component of the liquid phase. In an embodiment, the WBM is an emulsion having aqueous fluid as the external or continuous phase and nonaqueous fluid as the internal or discontinuous phase. In an embodiment, the aqueous fluid component of the WBM may generally comprise any suitable aqueous liquid. Examples of suitable aqueous fluids include, but are not limited to, sea water, freshwater, naturally-occurring and artificially-created brines containing organic and/or inorganic dissolved salts, liquids comprising water-miscible organic compounds, and combinations thereof. Examples of suitable brines include, but are not limited to, chloride-based, bromide-based, or formate-based brines containing monovalent and/or polyvalent cations and combinations thereof. Examples of suitable chloride-based brines include, but are not limited to, sodium chloride and calcium chloride. Examples of suitable bromide-based brines include, but are not limited to, sodium bromide, calcium bromide, and zinc bromide. Examples of suitable formate-based brines include, but are not limited to, sodium formate, potassium formate, and cesium formate. In an embodiment, the WBM comprises greater than about 50% aqueous fluid by total weight of fluid, alternatively greater than about 55, 60, 65, 70, 75, 80, 85, or 90%.

In some embodiments, the wellbore servicing fluid comprises an OBM. In an embodiment, the OBM comprises a non-aqueous fluid as the predominant component of the liquid phase and/or invert emulsions wherein the continuous phase is a non-aqueous fluid. In an embodiment the non-aqueous fluid is an oleaginous fluid. Examples of oleaginous fluids suitable for use in an OBM include, but are not limited to, petroleum oils, natural oils, synthetically-derived oils, or combinations thereof. More particularly, examples of oleaginous fluids suitable for use in the present disclosure include, but are not limited to, diesel oil, kerosene oil, mineral oil, synthetic oil such as polyolefins (e.g., alpha-olefins and/or internal olefins), polydiorganosiloxanes, esters, diesters of carbonic acid, paraffins, or combinations thereof. Examples of oleaginous fluids suitable for use in an OBM include without limitation PETROFREE organic carrier fluid, which is an organic ester-based fluid, INVERMUL RF which is an oil-based mud (OBM) drilling fluid, XP-base fluid which is a synthetic paraffin base fluid all of which are available from Baroid Drilling Fluids and, ESCAID 110 hydrocarbon fluid which is a petroleum distillate commercially available from EXXON-MOBIL Corp.

In some embodiments, additives may be included in the drilling fluid for improving or changing the properties thereof. Examples of such additives include but are not limited to salts, accelerants, surfactants, set retarders, defoamers, settling prevention agents, weighting materials, dispersants, vitrified shale, formation conditioning agents, or combinations thereof. These additives may be included singularly or in combination. Methods for introducing these additives and their effective amounts are known to one of ordinary skill in the art with the aid of this disclosure.

In some embodiments, the wellbore servicing fluid comprises a LCM. LCMs may be used to block the flow of fluid through lost circulation zones in a subterranean formation. Additionally, LCMs such as those disclosed herein may be used to improve wellbore pressure containment ability when introduced to areas of lost circulation. In an embodiment, the LCM is further characterized by a rough surface.

In an embodiment, the LCM comprises a polyelectrolyte multilayer material (PEMM) wherein the PEMM comprises a base material having a plurality of electrolyte layers and a charged surface. The LCM may further comprise a counterion that is associated with the charged surface of the PEMM. In an embodiment the LCM comprises a PEMM and a first counterion. In another embodiment the LCM comprises a PEMM and a second counterion wherein the first counterion and second counterion are different.

In an embodiment, the wettability of the LCM is a function of the counterion. For example, the LCM may be hydrophobic when contacted with a first counterion, however, contact of the LCM with a second different counterion may trigger a change in the wettability of the LCM such that contacting of the LCM with the second counterion results in the LCM becoming hydrophilic or vice versa. In an embodiment, an LCM of the type disclosed herein having a PEMM can experience a switch in wettability as a function of the counterion it is contacted with. Thus, an LCM of the type disclosed herein is characterized by a tunable wettability, more specifically a counterion-responsive tunable wettability.

An LCM of the type disclosed herein may comprise a PEMM which is formed by associating at least two electrolytes with a base material. The base material may comprise cellulosic material; resilient graphitic carbon; ground rubber; nut shells; diatomaceous earth; cotton; wood, shredded cane stalks, fiber; hair, mica flakes; plastic pieces; cellophane sheeting; limestone; formica, corncobs, synthetic fiber, natural fiber, or combinations thereof. In an embodiment, the base material is cotton.

The electrolytes may be associated with the base material using any suitable technology. For example, the electrolytes may be coated onto the base material. In an embodiment, the electrolytes are placed on the base material using a layer by layer technology (LbL). In such an embodiment, the PEMM is formed by coating layers of one or more electrolyte materials onto the base material. The LbL deposition of electrolytes provides a route to immobilize charges onto various surfaces. The LbL approach can be performed on virtually any kind of substrate, without the need for aggressive chemical or physical pretreatment of the substrate. Without wishing to be limited by theory it is hypothesized that in the multilayers assembled on the basis of electrostatic interactions there exists excess charges and associated counterions, and that the counterions can be capitalized to modulate the wettability of the surface. The procedure of preparing a PEMM is discussed in greater detail in "Tunable Wettability and Rewritable Wettability Gradient from Superhydrophilicity to Superhydrophobicity" by Wang et al. Langmuir, 2010, Volume 26, Issue 14, pages 12203-12208 which is incorporated by reference herein in its entirety.

In an embodiment a PEMM is prepared by contacting the base material with a plurality of electrolytes. For example, a base material (e.g., cotton) may be contacted with a first electrolyte and a second electrolyte. In an embodiment, the first electrolyte comprises polu(diallyldimethylammoniumchloride) (PDDA), poly(sodium4-styrene sulfonate) (PSS), polyethylene imine, polyallyl ammonium, polymaleic acid copolymer, partially hydrolyzed polyacrylamide, polyacrylate copolymers, or combinations thereof while the second electrolyte may comprise comprises poly(diallyldimethylammoniumchloride) (PDDA), poly(sodium4-styrene sulfonate) (PSS), polyethylene imine, polyallyl ammonium, polymaleic acid copolymer, partially hydrolyzed polyacrylamide, polyacrylate copolymers, or combinations thereof. In an embodiment, the first electrolyte comprises PDDA and the second electrolyte comprises PSS. Alternatively, the first electrolyte comprises PSS and the second electrolyte comprises PDDA.

A method of making a PEMM of the type described herein comprises immersing a base material (e.g., cotton) in a first electrolyte (e.g., PDDA) to form a coated base material and immersing the coated base material in a second electrolyte (e.g., PSS) to form a PEMM. The base material may be immersed in any amount of the first electrolyte under any conditions compatible with the base material and suitable for formation of a coating of the electrolyte onto the base material. For example, the base material may be immersed in the first electrolyte for a time period of from about 0.01 hours to about 3 hours, alternatively from about 0.1 hours to about 2 hours, or alternatively from about 1 hour to about 2 hours at about room temperature. Similar conditions may be employed for coating the base material with the second electrolyte.

In some embodiments, the base material may be coated with any number of layers of electrolyte as needed to meet some user and/or process goal. In an embodiment, the base material is coated with at least two different electrolytes. In an embodiment, the PEMM comprises at least two layers of electrolytes wherein the first layer is a coating of first electrolyte and is disposed adjacent to the second layer wherein the second layer is a coating of the second electrolyte. Further, it is contemplated that the base material may be immersed in the electrolyte so as to provide a substantially uniform coating that substantially covers the available surface area of the base material. Herein, "substantially uniform" refers to greater than about 90% of the coating of electrolyte on the base material is of comparable thickness, alternatively greater than about 91, 92, 93, 94, 95, 96, or 97%. Herein, "substantially covers the base material" refers to greater than about 90% of the surface area of the base material being coated by the electrolyte, alternatively greater than about 91, 92, 93, 94, 95, 96, or 97%. In some embodiments, the base material may be coated so as provide a region of the base material that is coated by a first electrolyte to the exclusion of a second electrolyte. Alternatively, the base material may be coated so as provide a region of the base material that is coated by a second electrolyte to the exclusion of a first electrolyte. It is contemplated that one of ordinary skill in the art with the benefits of this disclosure may be able to prepare a PEMM having electrolyte coatings disposed on the base material in any manner or fashion that fulfills some user and/or process goal.

In an embodiment, a method of preparing a PEMM may further comprise washing the coated base material prior to immersion of the coated base material in an electrolyte solution, between successive coatings of electrolyte solution or both. Alternatively, a method of preparing a PEMM may comprise drying the coated base material after washing and/or prior to immersion of the coated base material in a first or subsequent electrolyte solution. For example, a method of preparing a PEMM may be divided into cycles wherein a first cycle comprises immersing a base material in an electrolyte solution to form a coated base material. The coated base material may be washed by immersion or contact with a washing solution and subsequently dried under any conditions suitable for the removal of excess washing solution and/or solvent from the coated base material. Collectively washing and/or drying of the coated base material is herein termed processing. The processed coated base material may be subjected to a second cycle where the processed coated base material is immersed in a second electrolyte which differs from the first electrolyte (and optionally washed or dried) to form a PEMM. The PEMM may be subjected to any number of additional cycles or processing of the type disclosed herein to meet one or more user and/or process goals.

In an embodiment, the base material may be coated with a first and second electrolyte sequentially as described herein. Alternatively, the base material may be coated with a first and second electrolyte simultaneously.

In an embodiment, any individual cycle produces an electrolyte coating having a thickness of from about 1 nm to about 10 nm, alternatively from about 1 nm to about 7.5 nm, or alternatively from about 1 nm to about 5 nm. In an embodiment, the PEMM is subjected to the number of cycles of the type disclosed herein sufficient to form a PEMM having a total coating thickness (i.e., sum of all the electrolyte coatings) of from about 1 nm to about 100 nm, alternatively from about 1 nm to about 50 nm or alternatively from about 2 nm to about 30 nm. The coating thickness of the PEMM may be determined using any suitable methodology. For example the coating thickness of the PEMM may be measured by atomic force microscope (AFM) operated in tapping mode.

In an embodiment, the PEMM prepared as described herein is resistant to mechanical or physical forces that would result in the electrolyte coating being removed from or no longer associated with the base material.

A PEMM as described herein has a charged surface that is neutralized by the presence of a counterion. Examples of counterions suitable for use in this disclosure include without limitation halides; chloride ($Cl^-$); perfluororooctanoate (PFO); heptafluorobutyric acid (HFB); sulfonates; phosphonates; fatty acids, carboxylates; positively charged counterions such as alkali metals, alkaline earth metals; ammonium ions; phosphonium ions; imidazolium ions; pyrrolidinium ions; perfluorinated species of ammonium, phosphonium, imidazolium, or pyrrolidinium; or combinations thereof.

In an embodiment, the wettability of the LCM may be determined by measuring the water contact angle on the surface of the LCM. Any suitable methodology may be employed for measuring the water contact angle. Surfaces having a water contact angle of less than about 90° are considered hydrophilic while surfaces having a water contact angle of greater than about 90° are considered hydrophobic.

Without wishing to be limited by theory, for a LCM of the type disclosed herein the surface wettability is dependent on the type of counterion coordinated to the charged surface. In an embodiment, the LCM comprising a PEMM charge-associated with a first counterion (e.g., $Cl^-$) may exhibit a small water contact angle indicating the surface has a low surface energy and is hydrophilic. Upon exchanging the first counterion (e.g., $C^-$) with a second counterion (e.g., $PF_6^-$), for example the $PF_6^-$ may displace the $Cl^-$, the hydrophobicity of the LCM increases generating a larger water contact angle indicating water molecules are being repelled from a high energy hydrophobic surface. In some embodiments, exchange of the counterions may be confirmed by X-ray photoelectron spectroscopy (XPS) measurements. In one embodiment of the LCM described herein, the alternate adsorption of oppositely charged electrolytes, PDDA and PSS, may form a LCM with PDDA as the outer surface which may be switchable/tunable from hydrophilic to hydrophobic or vice versa. In one embodiment of the LCM described herein, the alternate adsorption of oppositely charged electrolytes, PDDA and PSS, may form a LCM with PSS as the outer surface which may be switchable/tunable from hydrophilic to hydrophobic or vice versa. Therefore, in some embodiments, the tunable LCM's surface is hydrophilic. In another embodiment, the tunable LCM's surface is hydrophobic.

Without wishing to be limited by theory, the LCM having a PEM may be characterized by a positively charged surface that is associated with a negatively charged counterion. Thus, changes in wettability upon counterion exchange may be attributed to the hydration characteristics of the counterions. In some embodiments, a LCM comprising PEMM deposited on a base material such as cotton which has a rough surface, may result in a surface with a first counterion (e.g., $Cl^-$) which is hydrophilic that displays a water contact angle of less than about 5 degrees. Replacing the $Cl^-$ counterions in the LCM with a second counterion (e.g., PFO) results in the surface becoming hydrophobic with a water contact angle of about 180 degrees.

In some embodiments, the LCM surface is in a Wenzel state, in another embodiment, the LCM surface is in a Cassie State. Herein, the Wenzel state refers to the condition wherein water droplets on a rugged hydrophobic surface are in full contact with the rugged surface, also termed wetted contact. Herein, the Cassie state refers to a condition wherein water droplets on a rugged hydrophobic surface are in contact with peaks of the rugged surface as well as the air pockets trapped between surface grooves, also referred to as composite contact. In some embodiments, the LCM described herein comprises a surface with a water contact angle that may have a range of from about 0.1 degrees to about 180 degrees. In an embodiment, the LCM described herein comprises a surface with a water contact angle of less than about 90° and is hydrophilic. Alternatively, the LCM described herein comprises a surface with a water contact angle of less than about 5° and is superhydrophillic. Alternatively, the LCM described herein comprises a surface with a water contact angle of greater than about 90° and is hydrophobic. Alternatively, the LCM described herein comprises a surface with a water contact angle of greater than about 120° and is superhydrophobic.

In an embodiment, the LCM is present in the wellbore servicing fluid in an amount of from about 5 pounds per barrel (lb/bbl) to about 200 lb/bbl, alternatively from about 10 lb/bbl to about 150 lb/bbl, or alternatively from about 15 lb/bbl to about 120 lb/bbl.

In some embodiments, the wettability of the surface can be transitioned/switched from a hydrophobic to a hydrophilic material or vice versa by exchange of the counterions. Switching of the LCM from hydrophobic to hydrophilic or vice versa may be carried out for any number of times to meet some user and/or process goal. In an embodiment, a change in the wettability of the LCM is a result of exchanging PFO and $Cl^-$ counterions. Referring to FIG. 1, a change in water contact angles for a LCM as a result of switching the counterions from $Cl^-$ to PFO is depicted. The FIGURE shows the reduction in the water contact angle in the presence of the $Cl^-$ counterion indicating the surface is hydrophilic. Exchange of the $Cl^-$ for PFO results in a large increase in the water contact angle indicating the LCM is now hydrophobic. The LCM may be subjected to a counterion exchange and subsequent change in wettability at least once, alternatively at least 2, 3, 4, 5, 6, 7, 8, 9, or 10 times. In some embodiments, an LCM of the type disclosed herein is dynamically and reversibly tunable between hydrophilicity and hydrophobicity. Therefore, in some embodiments the wettability of the tunable LCM is cycled between hydrophobic and hydrophilic.

In some embodiments, the wettability of the tunable LCMs described herein comprises a tunable gradient, whereby the counterions are selected to provide water contact angles that range from less than about 5 degrees to about 180 degrees thereby producing surfaces that range from superhydrophilic to superhydrophobic. In an embodiment, the counterion comprises HFB. In an embodiment, the counterion comprises bis(trifluoromethanesulfonyl)imide (TFSI) anions.

The LCMs disclosed herein may be introduced to the wellbore to prevent the loss of aqueous or non-aqueous drilling fluids into lost circulation zones such as voids, vugular zones, and natural or induced fractures while drilling. The LCMs disclosed herein may provide a single material that is compatible with both oil-wet and water-wet wellbore servicing environments depending on the associated counterion.

In some embodiments, a method of blocking the flow of fluid through a lost circulation zone in a subterranean comprises placing a wellbore servicing fluid comprising a LCM into the lost circulation zone, wherein said LCM comprises a PEMM and a first counterion. The method may further comprise adding a second counterion to said wellbore servicing fluid, triggering a counterion exchange, and thereby tuning the wettability of the LCM. Thus, in an embodiment, the LCM displays a first state that is either hydrophilic or hydrophobic depending on the nature of the first counterion and upon exchange of the first counterion with the second counterion the LCM displays a second state that is opposite of the first state (i.e., either hydrophobic or hydrophilic).

In an embodiment, a method of servicing a wellbore comprises tuning/switching the wettability of a LCM downhole. The method may comprise adding to a lost circulation zone within a wellbore the LCM, wherein the LCM comprises a PEMM material and a first counterion and the LCM is hydrophilic. Addition of a second counterion to the wellbore may result in exchange of the first counterion with the second counterion wherein the second counterion is hydrophobic in nature and renders the LCM hydrophobic. Addition of the second counterion to the wellbore may be carried out using any suitable methodology. For example, the second counterion may be a component of a wellbore servicing fluid that is placed into the wellbore alternatively; a solution of the second counterion may be formulated and placed into the wellbore.

In an alternative embodiment, the method may comprise adding to a lost circulation zone within a wellbore the LCM, wherein the LCM comprises a PEMM material, and a first counterion and the LCM is hydrophobic. Addition of a second counterion to the wellbore may result in exchange of the first counterion with the second counterion wherein the second counterion is hydrophilic in nature and renders the LCM hydrophilic. Downhole switching of the wettability of the LCM provides the advantage of allowing the LCM which has a polarity that is compatible with the wellbore and/or subterranean formation to enter lost circulation zones and reduce the loss of fluid to said zones. The LCM which initially enters the lost circulation zones in addition to having a polarity that is compatible with the wellbore and/or subterranean formation has a particle size that allows the material to remain dispersed within the wellbore servicing fluid and to pass through the drill bit. Upon counterion exchange the LCM experiences a switch in wettability that results in agglomeration of the LCM materials thereby forming larger particles which may further obstruct the loss of fluids to fractures or other areas in the lost circulation zones. In an embodiment, the agglomerated LCM may inhibit or prevent the loss of fluid to larger fractures within the lost circulation zone. The downhole switching of wettability of the LCMs of this disclosure advantageously affords the formation of large particles from smaller LCM particles which have passed through the bit thereby reducing risk of plugging drillstring and downhole tools.

In an embodiment, the components of the wellbore servicing fluid are combined at the site of the wellbore experiencing lost-circulation. Alternatively, the components of the wellbore servicing fluid are combined off-site and then later used at the site of the wellbore experiencing lost circulation.

In a further embodiment, the second counterion may be added to the wellbore servicing fluid at the same time as the LCM. In such embodiments, the second counterion may be in a form that provides a delayed release of the second counterion (e.g., encapsulated second counterion) such that the second counterion when released contacts the PEMM and exchanges with the first counterion after some user and/or process desired time delay. Thus, the wettability of the LCM is switched after some predetermined time period.

In another embodiment, the second counterion is added to the wellbore sometime after the LCM was added to the wellbore servicing fluid. Thus, the second counterion in some embodiments is added directly to the wellbore to tune or switch the wettability of the LCM already disposed within the wellbore, thus providing a means to change the wettability of LCMs that are already downhole.

The LCMs of this disclosure may provide lost circulation control in a sufficiently short time period to prevent the operator from pulling out of the hole and thus reducing nonproductive rig time. In some embodiments, the materials, compositions and methods disclosed herein provide a means to change the wettability of the LCM downhole, by triggering a switch in wettability of the LCM. The switch in wettability is triggered by adding a second counterion that invokes a simple counterion exchange at the surface of the PEMM, thereby controlling the degree of hydrophobicity/hydrophilicity of the LCM and the ability to seal off or plug holes in the subterranean formation. The switching technique allows for the reversibility of the effect of the counterion, hence allowing the switch of the surface from hydrophilic to hydrophobic or vice versa as drilling requirements change. Further, the use of an LCM of the type disclosed herein provides a single method of treating lost circulation that is compatible with both hydrophobic and hydrophilic environments. Use of counterion exchange to control the wettability of the LCM affords a material that can alter the permeability of the formation to provide a wide variety of advantages such as reducing or preventing the loss of fluids to a formation, enhancing oil recovery or facilitating production.

While embodiments have been shown and described, modifications thereof can be made by one skilled in the art without departing from the scope or teachings herein. The embodiments describe herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A method of servicing a wellbore in contact with a subterranean formation, comprising: (i) placing a wellbore servicing fluid comprising a drilling fluid and lost circulation material into a lost circulation zone within the wellbore, wherein the lost circulation material comprises: a polyelectrolyte multilayer material and a first counterion; and
   (ii) contacting the lost circulation material with a second counterion that is different from the first counterion, wherein the contacting occurs within the subterranean formation and wherein the lost circulation material forms an agglomerated lost circulation material.

2. The method of claim 1 wherein the polyelectrolyte multilayer material is prepared by contacting a base material with at least a first electrolyte.

3. The method of claim 2 wherein the base material comprises cellulosic material; resilient graphitic carbon; ground rubber; nut shells; diatomaceous earth; cotton; wood, shredded cane stalks, fiber; hair, mica flakes; plastic pieces; cellophane sheeting; limestone; formica, corncobs, synthetic fiber, natural fiber, or combinations thereof.

4. The method of claim 2 wherein the at least a first electrolyte comprises poly(diallyldimethylammoniumchloride) (PDDA), poly(sodium4-styrene sulfonate) (PSS), polyethylene imine, polyallyl ammonium, polymaleic acid copolymer, partially hydrolyzed polyacrylamide, polyacrylate copolymers, or combinations thereof.

5. The method of claim 1 wherein the polyelectrolyte multilayer material is prepared by a layer-by-layer technology.

6. The method of claim 2 wherein contact with the first electrolyte results in a coating of the electrolyte on the base material to form a coated base material.

7. The method of claim 6 wherein the coated base material has a coating thickness of from about 1 nm to about 10 nm.

8. The method of claim 6 wherein the coated base material is contacted with a second electrolyte to form the polyelectrolyte multilayer material.

9. The method of claim 1 wherein the polyelectrolyte multilayer material has a coating thickness of from about 1 nm to about 100 nm.

10. The method of claim 1 wherein the drilling fluid is a water-based mud, an oil-based mud, an emulsion, or an invert emulsion.

11. The method of claim 1 wherein the lost circulation material is present in the wellbore servicing fluid in an amount of from about 5 lb/bbl to about 200 lb/bbl.

12. The method of claim 1 wherein the lost circulation material is hydrophobic.

13. The method of claim 1 wherein the lost circulation material is hydrophilic.

14. The method of claim 1 wherein contacting of the lost circulation material with the second counterion switches the lost circulation material from being hydrophobic to hydrophilic.

15. The method of claim 1 wherein contacting of the lost circulation material with the second counterion changes the water contact angle of the lost circulation material from greater than about 90° to less than about 90°.

16. The method of claim 1 wherein contacting of the lost circulation material with the second counterion switches the lost circulation material from being hydrophilic to hydrophobic.

17. The method of claim 1 wherein contacting of the lost circulation material with the second counterion changes the water contact angle of the lost circulation material from less than about 90° to greater than about 90°.

18. The method of claim 1 wherein the first counterion comprises halides; chloride ($Cl^-$); perfluororooctanoate (PFO); heptafluorobutyrate (HFB); sulfonates; phosphonates; fatty acids, carboxylates; positively charged counterions; alkali metals; alkaline earth metals; ammonium ions; phosphonium ions; imidazolium ions; pyrrolidinium ions; perfluorinated species of ammonium, phosphonium, imidazolium, or pyrrolidinium; or combinations thereof.

19. The method of claim 1 wherein the second counterion comprises halides; chloride ($Cl^-$); perfluororooctanoate (PFO); heptafluorobutyrate (HFB); sulfonates; phosphonates; fatty acids, carboxylates; positively charged counterions; alkali metals; alkaline earth metals; ammonium ions; phosphonium ions; imidazolium ions; pyrrolidinium ions; perfluorinated species of ammonium, phosphonium, imidazolium, or pyrrolidinium; or combinations thereof.

20. A method of switching the wettability of a lost circulation material downhole, comprising:
adding to a lost circulation zone within a wellbore, the lost circulation material, wherein the lost circulation material comprises:
a polyelectrolyte multilayered substrate and a first counterion and wherein the lost circulation material is in a Cassie state; and
adding a second, different counterion to the wellbore, the second counterion triggering a counterion exchange, thereby tuning the wettability of the lost circulation material downhole.

21. The method of claim 20 wherein the lost circulation material when placed downhole is hydrophobic and wherein the counterion exchange results in the lost circulation material being hydrophilic.

22. The method of claim 1 wherein the lost circulation material in step (i) is in a Cassie state.

23. The method of claim 1 wherein the lost circulation material in step (i) is in a Wenzel state.

24. The method of claim 1 wherein the polyelectrolyte multilayer material is formed via alternate adsorption of oppositely charged electrolytes comprising poly(diallyldimethylammoniumchloride) (PDDA) and poly(sodium4-styrene sulfonate) (PSS).

* * * * *

UNITED STATES PATENT AND TRADEMARK OFFICE
CERTIFICATE OF CORRECTION

PATENT NO. : 8,765,645 B2 Page 1 of 1
APPLICATION NO. : 13/423769
DATED : July 1, 2014
INVENTOR(S) : Philip Wayne Livanec et al.

It is certified that error appears in the above-identified patent and that said Letters Patent is hereby corrected as shown below:

In the Specification

In Column 3, line 48, replace "XP-base" with --XP-07 base--.

In Column 4, line 58, replace "polu(diallydimethylammoniumchloride)" with --poly(diallydimethylammoniumchloride)--.

In Column 6, line 52, replace "(e.g., C⁻)" with --e.g., Cl⁻)--.

Signed and Sealed this
Thirtieth Day of September, 2014

Michelle K. Lee
*Deputy Director of the United States Patent and Trademark Office*